(12) United States Patent
Tanaka et al.

(10) Patent No.: US 7,532,397 B2
(45) Date of Patent: May 12, 2009

(54) OPTICAL MATERIAL, OPTICAL DEVICE FABRICATED THEREFROM, AND METHOD FOR FABRICATING THE SAME

(75) Inventors: Takuo Tanaka, Wako (JP); Satoshi Kawata, Wako (JP)

(73) Assignee: Riken, Saitama (JP)

( * ) Notice: Subject to any disclaimer, the term of this patent is extended or adjusted under 35 U.S.C. 154(b) by 352 days.

(21) Appl. No.: 11/455,092

(22) Filed: Jun. 19, 2006

(65) Prior Publication Data

US 2007/0014006 A1 Jan. 18, 2007

(30) Foreign Application Priority Data

Jun. 20, 2005 (JP) ............................. 2005-179621

(51) Int. Cl.
*G02B 5/30* (2006.01)
(52) U.S. Cl. ................. 359/487; 333/219.1; 333/219.2; 977/834
(58) Field of Classification Search ....................... None
See application file for complete search history.

(56) References Cited

OTHER PUBLICATIONS

T. Tanaka, A. Ishikawa, S. Kawata, 'Unattenuated light transmission through the interface between two materials with different indices of refraction using magnetic metamaterials', Phys. Rev. B, vol. 73, Mar. 23, 2006, 125423.*
C. Fu, M. Zhang, P. First, 'Brewster angle with a negative-index material', Appl. Opt., vol. 44, No. 18, Jun. 20, 2005, pp. 3716-3724.*
Y. Tamayama, T. Nakanishi, K. Sugiyama, M. Kitano, 'Observation of Brewster's effect for transverse-electric electromagnetic waves in metamaterials: Experiment and theory', Phys. Rev. B, vol. 73, May 17, 2006, 193104.*

* cited by examiner

*Primary Examiner*—Arnel C Lavarias
(74) *Attorney, Agent, or Firm*—Birch, Stewart, Kolasch & Birch, LLP

(57) ABSTRACT

In order to make a reflection coefficient in boundary surface between materials to be zero and permeate 100% of a light independent of a polarization direction, an optical device made of an optical material composed of a metamaterial prepared by arranging a plurality of at least either of electrical resonators or magnetic resonators each being smaller than a wavelength of a light wave in only a predetermined plane, and at least either of the electrical resonators and the magnetic resonators arranged functioning with respect to s-polarization, wherein at least either of the dielectric constant or the magnetic permeability is controlled in response to the function to induce a Brewster phenomenon in the s-polarization.

4 Claims, 14 Drawing Sheets

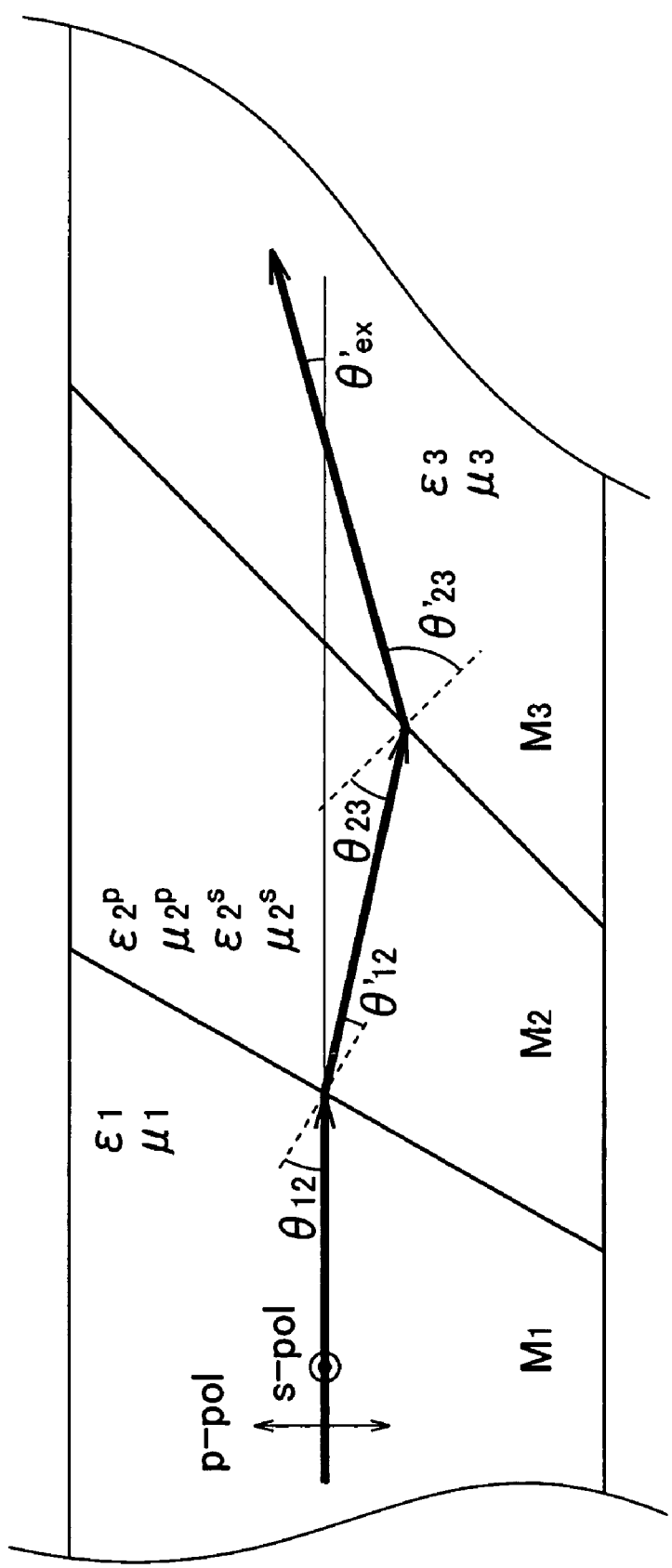

OPTICAL MATERIAL, OPTICAL DEVICE FABRICATED THEREFROM, AND METHOD FOR FABRICATING THE SAME

BACKGROUND OF THE INVENTION

1. Field of the Invention

The present invention relates to an optical material, an optical device fabricated therefrom, and a method for fabricating the same, and more particularly to an optical material, an optical device fabricated therefrom, and a method for fabricating the same utilizing a metamaterial

2. Description of the Related Art

It is known that when a light wave inputs into a boundary surface between materials having different refractive indices from one another, reflection of the light appears in the boundary surface as an optical phenomenon.

There are a variety of manners for interpretation as to the optical phenomenon. One of these interpretations is in that since a difference in refractive indices between materials functions as a potential barrier for a light wave, a part of the light wave is reflected. Another interpretation is in that when there is impedance mismatching in an electric circuit, electric signals are reflected at that point, and such impedance mismatching is equivalent to a difference in refractive indices for light likewise.

In general, reflection of light appearing in a boundary surface due to inputting a light wave into the boundary surface between materials having different refractive indices can be eliminated with respect to a light having a specified polarization, when a particular surface treatment such as dielectric multilayer coating is applied. Accordingly, it is possible that a reflection coefficient is allowed to be zero by means of a particular surface treatment such as the above-described dielectric multilayer coating. In this respect, it is known also that such reflection of light can be made to be zero under a particular condition.

The particular condition means that for inducing a phenomenon wherein reflection of light becomes zero known by the name of "Brewster" in optics (hereinafter referred to as "Brewster phenomenon" in the present specification). The conditions for inducing such Brewster are called "Brewster conditions" wherein both the following two conditions (a) and (b) must be satisfied.

More specifically, the two conditions (a) and (b) are:

(a) A light wave inputs into a boundary surface between materials in the form of p-polarization; and (b) The light wave inputs into the boundary surface at a particular incident angle determined by refractive indices of two materials forming the boundary surface (the incident angle is called "Brewster's angle").

Thus, the above-described two conditions (a) and (b) must be satisfied for inducing the Brewster phenomenon, but there is a restriction of the above-described condition (a), so that it is possible to make a reflection coefficient to be zero at the boundary surface due to the Brewster phenomenon in only the case where a light wave is in p-polarization. Accordingly, there is such a problem that such Brewster phenomenon cannot be induced with respect to a light wave in s-polarization, so that reflection cannot be eliminated in the boundary surface except that either a particular surface treatment such as dielectric multilayer coating is applied, or a refractive index difference of a material is made to be zero.

On the other hand, there is a strong demand for eliminating a reflection loss appeared on surfaces of a lens, a mirror, and a window application in, for example, a laser resonator or an optics system of optical communication systems as much as possible. Particularly, there is a case where significant decrease arises in characteristic properties due to a slight reflection loss inside a resonator of a laser and the like, so that it is requested that the reflection loss is allowed to be close to zero as much as possible.

For this reason, such a manner that an end surface of an optical device is cut off into a Brewster's angle in a laser resonator or an optics system of optical communication systems, whereby the above-described condition (b) is satisfied to decrease the reflection loss is frequently applied.

As mentioned above, however, since a Brewster phenomenon is that appearing only concerning a light in p-polarization, zero reflection loss is obtained only with respect to a light wave of a p-polarization component as a result of satisfying the above-described condition (b). Such a problem that a reflection loss yet appears as to an s-polarization component still remains.

Hence, a difference appears between both application efficiencies in the p-polarization component and the s-polarization component in the laser resonator or the optics system of optical communication systems wherein an end surface of the optical device is cut out in a Brewster's angle. For instance, at the mention of a laser resonator, an oscillation light of the laser resonator wherein the end surface of an optical device has been cut out in a Brewster's angle becomes a linearly-polarized laser beam having finally a p-polarization component only. Furthermore, when an optical device the end surface of which has been cut out in the Brewster's angle is used in an optical communication system, the optics system having extremely high polarization dependency is obtained. Efficiency of such optics system decreases extremely, when a polarization direction of the incident light differs from a polarization plane direction of the optics system at the time of design thereof.

As described above, a Brewster phenomenon has strong polarization dependency; and in this respect, the polarization direction of a light wave still remains remarkable dependency with respect to the structure of a dielectric multilayer film by which the reflection coefficient may be made to be zero. Thus, it is impossible to realize such a coating by which the reflection coefficient may be made to be zero independent of the polarization direction.

As described above, reflection of a light wave arises inevitably in the boundary surface between two materials having different refractive indices from one another. In this connection, a manner for making the reflection to be zero is to utilize the Brewster phenomenon.

In the prior art, however, even when the Brewster phenomenon is used, such Brewster phenomenon cannot be induced in only p-polarization. As a result, there is such a problem that an optical device utilizing the Brewster phenomenon or a system involving the optical device comes to have strong polarization dependency. For this reason, it is strongly demanded to develop such optical material or optical device independent of a polarization direction, whereby the reflection coefficient may be made to be zero.

OBJECT AND SUMMARY OF THE INVENTION

The present invention has been made in view of the above-described problems involved in the prior art, and an object of the invention is to provide an optical material independent of the polarization direction so that the reflection coefficient may be made to be zero in the boundary surface between materials, whereby a light may be transmitted 100%; an optical device fabricated from the optical material; and a method for fabricating the optical device.

In order to achieve the above-described object, the present invention provides a novel optical material by which a Brewster phenomenon that has been heretofore known in a field of optics as the one which appears in only a light wave of p-polarization may also be allowed to appear in another light wave of s-polarization; an optical device wherein the optical material is used, whereby reflection of a light in the boundary surface between materials may be made to be zero; and a method for fabricating the same together with a manner for designing the shape thereof and parameters of materials.

In other words, the inventors of the present application has found that when at least one of a dielectric constant $\in$ and a magnetic permeability $\mu$ being basic physical quantities determining the refractive index n of an optical material is controlled artificially, a Brewster phenomenon may be allowed to appear with respect to the s-polarization; and as a result, an optical material designed in such that the Brewster phenomenon may be induced simultaneously p-polarization with s-polarization is developed.

Furthermore, the inventors of the present application has developed an optical device and a method for fabricating the same wherein the above-described optical material is cut out in a specified shape; and the optical material thus cut-out is inserted between two media having different refractive indices, whereby the reflection to be produced in the boundary surface at the time when a light wave is propagated between these two media may be allowed to be zero.

More specifically, the present invention realizes a technology as to an optical material wherein the Brewster phenomenon can be induced simultaneously p-polarization with s-polarization by controlling at least either of a dielectric constant or a magnetic permeability, and another technology as to an optical device to which the above-described optical material is applied.

Namely, the present invention provides an optical material including a metamaterial prepared by arranging a plurality of at least either of electrical resonators or magnetic resonators each being smaller than a wavelength of a light wave in only a predetermined plane; and at least either of the electrical resonators and the magnetic resonators arranged functioning with respect to s-polarization, whereby at least either of the dielectric constant or the magnetic permeability is controlled in response to the function to induce a Brewster phenomenon in the s-polarization.

Furthermore, the present invention provides an optical device including the optical material obtained in the above-described invention; and the incident plane of a light wave being set out at a Brewster's angle with respect to p-polarization and further at least either of the dielectric constant and the magnetic permeability of the optical material being controlled with respect to the s-polarization of the optical material, whereby the Brewster condition is independently satisfied in both the p-polarization and the s-polarization at the same time.

Moreover, in the optical device of the present invention, the output directions of a p-wave and an s-wave may coincide with the input direction of a light wave.

Still further, the present invention provides a method for fabricating an optical device made of the optical material of the above-described invention including setting out the incident plane of a light wave at a Brewster's angle with respect to p-polarization; and controlling at least either of the dielectric constant and the magnetic permeability of the optical material with respect to s-polarization, whereby the Brewster condition is independently satisfied in both the p-polarization and the s-polarization at the same time.

Since the present invention is constructed as described above, there is such an excellent advantageous effect to provide an optical material which can make a reflection coefficient in the boundary surface between materials to be zero independent of the polarization direction and permeate 100% of a light, the optical device fabricated therefrom, and a method for fabricating the optical device.

The present invention as described above may be applied to a variety of optical instruments such as a laser resonator or optics system of optical communication systems.

BRIEF DESCRIPTION OF THE DRAWING

The present invention will become more fully understood from the detailed description given hereinbelow and the accompanying drawings which are given by way of illustration only, and thus are not limitative of the present invention, and wherein:

FIGS. 5(a) and 5(b) are explanatory views each showing an example of a positional relationship and an example of each dimension of a magnetic resonator in the optical material of the present invention wherein FIG. 5(a) is an explanatory view showing dimensions and positional relationships of magnetic resonators adjacent to each other in the case when the optical material of the invention is viewed from the direction of the arrow A, and FIG. 5(b) is an explanatory view showing the dimensions and the positional relationships of the magnetic resonators adjacent to each other in the case when the optical material of the invention is viewed from the direction of the arrow B;

FIG. 7 is an explanatory diagram showing an example wherein an optical device of the present invention fabricated by disposing it between two media having different refractive indices from one another is used as an optically transparent optical device;

FIGS. 8(a) and 8(b) are explanatory views each showing a method for setting out a boundary surface between a medium $M_2$ and another medium $M_3$ wherein FIG. 8(a) is an explanatory view wherein an incident angle is set out on the plus side, while FIG. 8(b) is an explanatory view wherein the incident angle is set out on the minus side;

DETAILED DESCRIPTION OF THE PREFERRED EMBODIMENTS

In the following, an example of a manner of practice of the optical material according to the present invention, the optical device fabricated therefrom, and a method for fabricating the same will be described in detail by referring to the accompanying drawings.

First, an optical material according to the present invention (hereinafter simply referred optionally to as "optical material of the invention") will be described. The optical material of the invention is composed of a metamaterial.

The metamaterial is constituted by three-dimensionally arranging dispersively micro-resonators each having a smaller wavelength than that of a light wave into a material, so that a resonation state of the micro-resonators which is smaller than a wavelength of the light wave to be input, whereby a dielectric constant or a magnetic permeability of such microscopic material are intended to be controlled.

The present invention has been made on the basis of the findings proved theoretically by the inventors of the present application wherein such metamaterials are also effective in a visible light region, so that the same advantageous effects in a microwave region can be realized in the former region.

In this case, a physical quantity of the material being directly concerned with the propagation of a light is a refractive index wherein the refractive index is uniformally decided, if a dielectric constant ($\in$) and a magnetic permeability ($\mu$) of the material are determined. In other words, basic physical quantities for deciding the propagation of a light wave are the dielectric constant and the magnetic permeability.

In this occasion, the dielectric constant corresponds to an electrical vector of the light wave, while the magnetic permeability corresponds to a magnetic vector. In a metamaterial, the dielectric constant of a material is independently controlled by an electric resonator composed of micro-resonators each being constituted as the one which is smaller than a wavelength of the light wave, while the magnetic permeability is independently controlled by a magnetic resonator composed of micro-resonators each being constituted as the one which is smaller than a wavelength of the light wave.

Figure 1:
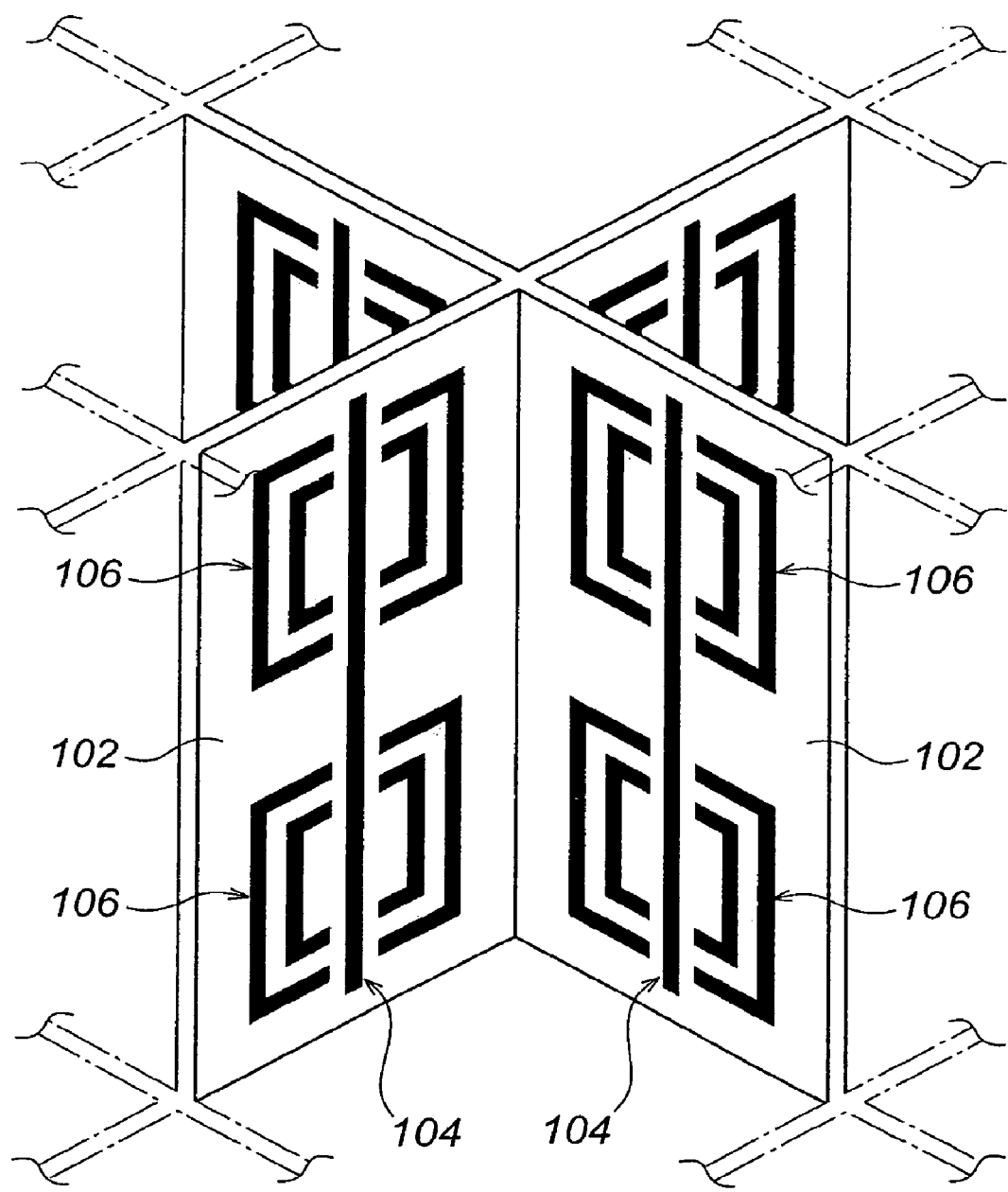
FIG. 1 is a conceptual constitutional explanatory view showing an example of a metamaterial which has been heretofore well-known.

For instance, FIG. 1 is a conceptual constitutional explanatory view showing an example of a heretofore well-known metamaterial wherein the metamaterial 100 is composed of electrical resonators 104 each formed by covering a base plate 102 made of an epoxy resin with copper in a striped shape and magnetic resonators 106 each formed by covering the base plate 102 with copper in doubly opposed C-shapes.

Furthermore, both of each electrical resonator 104 and each magnetic resonator 106 are formed in such that both the whole size of the electrical resonators 104 and the magnetic resonators 106 are formed to have a smaller size than a wavelength of a light wave to be input, respectively. In other words, each of the electrical resonators 104 and the magnetic resonators 106 are arranged in such that each of them is contained in a circle a diameter of which corresponds to the wavelength of the light wave to be input.

In the metamaterial 100, the dielectric constant is controlled independently by the electrical resonators 104, while the magnetic permeability is controlled independently by the magnetic resonators 106.

Namely, the electrical resonators 104 operate only in, for example, the case where the longitudinal directions of the striped shapes are in parallel to the direction of an electrical field vector of the light wave; and on the contrary, when the longitudinal directions of the striped shapes are perpendicular to a direction of the electrical field vector, they do never interact with each other. Likewise, the magnetic resonators 106 operate only the case where a magnetic field vector of the light wave penetrates through a plane including the C-shapes, while the magnetic resonators 106 do never interact with each other in the case where the magnetic field vector is in parallel to the plane including the C-shapes.

In other words, the electrical resonators 104 and the magnetic resonators 106 have directivities, respectively. Under the circumstances, when both the resonators are arranged only in a specified plane, it becomes possible to control the dielectric constant and the magnetic permeability with respect to a light wave in a specified direction of polarized electromagnetic radiation.

The optical material of the present invention utilizes the behavior of a metamaterial as described above wherein when a magnetic permeability or a dielectric constant, or both of them which take ordinarily a value of 1.0 are varied, it makes possible to induce a Brewster phenomenon in s-polarization also.

Figure 2:
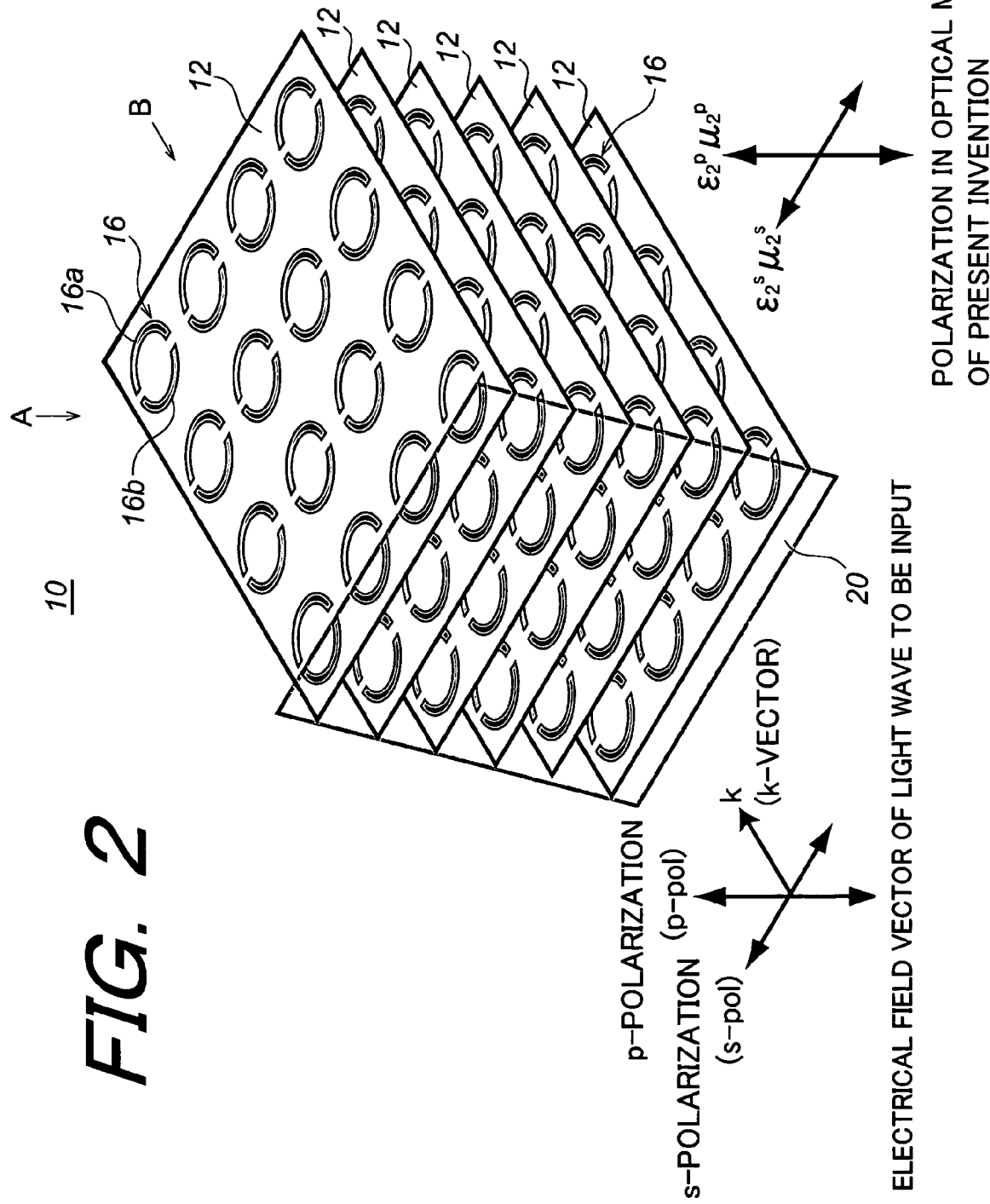
FIG. 2 is a conceptual constitutional explanatory view showing an example of a manner of practice of an optical material according to the present invention.

FIG. 2 is a conceptual constitutional explanatory view showing an example of a manner of practice for the optical material according to the present invention wherein an optical material 10 of the present invention involves a plurality of magnetic resonators 16 each formed in such that a glass base plate 12 is covered with C-shaped silver which is formed into opposed figures to each other. Each of the magnetic resonators 16 is composed of a first C-shaped part 16a having a semicircular profile and a second reversed C-shaped part 16b; and the whole size of these parts are formed so as to be smaller than a wavelength of the light wave to be input. In other words, the magnetic resonators 16 have a dimension which is contained in a circle a diameter of which corresponds to the wavelength of the light wave to be input.

The glass base plates 12 on which a plurality of the above-described magnetic resonators 16 are arranged are disposed so as to be in parallel to each other in a layered state wherein a magnetic permeability is controlled in the predetermined plane.

In the optical material 10 of the present invention, as shown in FIG. 2, the glass base plates 12 may be arranged in such that either they are attached to a glass base plate constituting a boundary surface 20 together with an outside material so as to maintain a predetermined gap between the adjacent glass base plates 12, or they are attached firmly to the target glass base plate while maintaining no gap with each other. In an other manner, the glass base plates 12 may be formed into a bulked shape with maintaining no gap between the adjacent glass plates without applying the glass base plate constituting the boundary surface 20.

In the case where a glass base plate constituting the boundary surface 20 together with an outside material is used, the glass base plate in question may be provided around the whole circumference of the optical material 10 of the present invention. On one hand, in the case where no glass base plate constituting the boundary surface 20 together with an outside material is used and the other glass base plates 12 are formed into a bulked shape without maintaining any gap between the adjacent glass plates, the boundary surface 20 may be constituted by polishing the outer circumferential surface of the bulk-shaped glass base plates.

Since s-polarization of a light wave to be input is perpendicular to the plane of incidence, the direction thereof becomes to be in parallel to the boundary surface 20 of the optical material 10 of the present invention, while p-polarization of the light wave to be input is in parallel to each other, so that the p-polarization inclines by an amount corresponding to the incident angle from the horizontal plane with respect to the boundary surface 20 of the optical material 10 of the present invention.

In the optical material 10 of the present invention, it is arranged in such that the predetermined plane on which the glass base plates 12 are provided has such a positional relationship that a magnetic field vector of s-polarization in a light wave penetrates the plane in question; the magnetic resonators 16 being formed on the glass base plate 12.

In the construction as described above, the magnetic permeability varies from 1.0 due to the magnetic resonators 16 in the optical material 10 of the present invention. Hence, when the magnetic permeability which takes usually a value of 1.0 is allowed to change, a Brewster phenomenon can be induced in s-polarization also.

Figure 3:
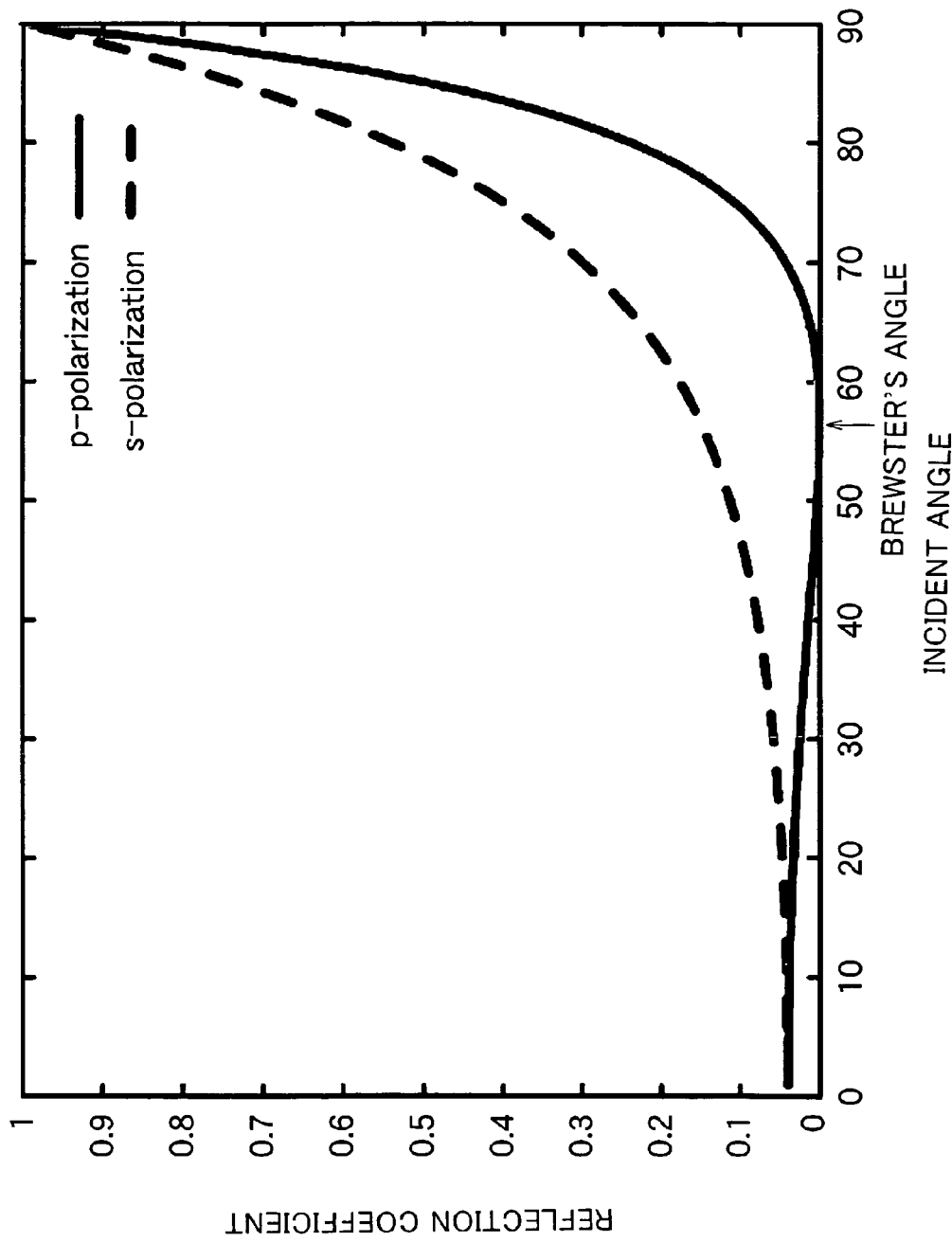
FIG. 3 is a graphical representation showing a relationship between an incident angle and a reflection coefficient in the case when a light wave is input to an ordinary glass.

Namely, FIG. 3 indicates a relationship between an incident angle and a reflection coefficient in the case when a light wave is input to normal glass wherein such normal glass has 1.0 magnetic permeability; and a Brewster phenomenon is induced in p-polarization in which the reflection coefficient becomes zero (the incident angle at that time is a Brewster's angle), while the reflection coefficient comes never to be zero in s-polarization.

Figure 4:
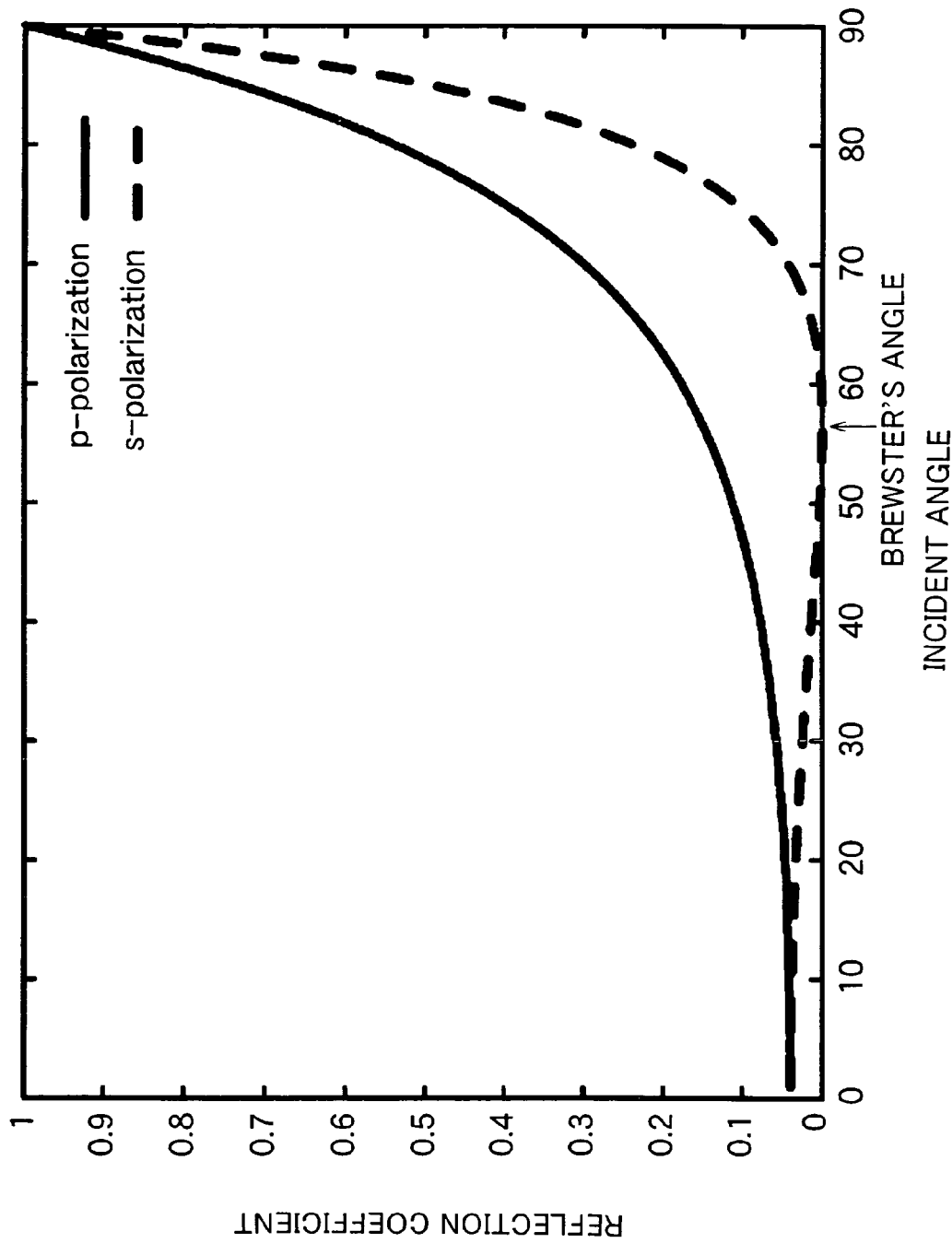
FIG. 4 is a graphical representation showing a relationship between an incident angle and a reflection coefficient in the case when a light wave is input to an optical material of the present invention.

On one hand, FIG. 4 indicates a relationship between an incident angle and a reflection coefficient in the case when a light wave is input to the optical material 10 of the present invention wherein the magnetic permeability of the optical material 10 of the invention is changed from 1.0 to 6.9964 due to the magnetic resonators 16; and a Brewster phenomenon is induced in s-polarization in which the reflection coefficient becomes zero (the incident angle at that time is a Brewster's angle), while the reflection coefficient comes never to be zero in p-polarization.

In the above description, although the case where only the magnetic resonators are provided and the magnetic permeability thereof is varied, it may be arranged in such that electrical resonators are provided in place of the magnetic resonators, whereby the dielectric constant thereof is varied, whereby a Brewster phenomenon is induced in s-polarization also. Moreover, it may be arranged in such that magnetic resonators are provided together with electrical resonators; and the magnetic permeability and the dielectric constant thereof are varied, whereby a Brewster phenomenon is induced in s-polarization also.

Figure 5:
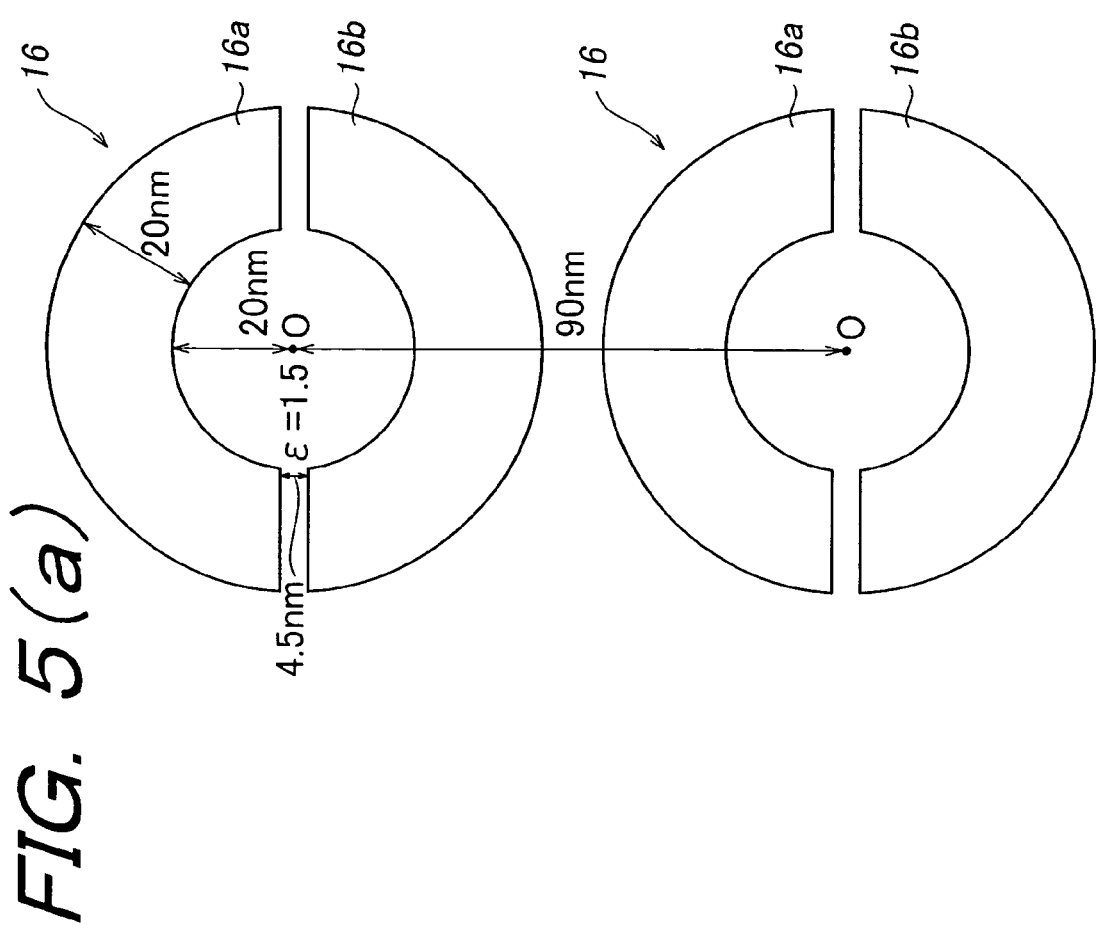

A positional relationship and each dimension of the magnetic resonators 16 in the case where the magnetic permeability is allowed to change from 1.0 to 3.29473 in the optical material 10 of the present invention are shown in FIGS. 5($a$) and 5($b$). For easy understanding, an illustration of the glass base plates 12 is omitted in FIGS. 5($a$) and 5($b$).

FIG. 5($a$) shows each dimension of the magnetic resonators 16 adjacent to each other and a positional relationship thereof in the case when viewed from the direction of the arrow A in FIG. 2, while FIG. 5($b$) shows each dimension of the magnetic resonators 16 adjacent to each other and a positional relationship thereof in the case when viewed from the direction of the arrow B in FIG. 2 wherein both the magnetic permeability of the magnetic resonators 16 in p-polarization and the dielectric constant of s-polarization are made to be 1.5 ($\in$=1.5).

More specifically, first, an explanation will be made by referring to FIG. 5($a$), when viewed from the direction of the arrow A in FIG. 2, a magnetic resonator 16 is composed of a first C-shaped part 16$a$ having a semicircular shape of an inner radius from the center O being 20 nm and an outer radius from the center O being 40 nm, and a second reversely C-shaped part 16$b$. The first C-shaped part 16$a$ is opposedly disposed to the second reversely C-shaped part 16$b$ to maintain a gap of 4.5 nm between each of opposed ends of the first and second C-shaped parts 16$a$ and 16$b$. A distance defined between the center O in one of the magnetic resonators 16 and the other center O in another adjacent magnetic resonator 16 is set out to be 90 nm.

On one hand, an explanation will be made by referring to FIG. 5($b$), when viewed from the direction of the arrow B in FIG. 2, the first C-shaped part 16$a$ and the second reversely C-shaped part 16$b$ have 20 nm thickness, respectively; and adjacent magnetic resonators 16 are disposed so as to have 10 nm gap, respectively. Accordingly, a distance defined between the central positions of the first C-shaped part 16$a$ and the second reversely C-shaped part 16$b$ along the thickness direction thereof in the adjacent magnetic resonators 16, respectively, is set out to be 30 nm.

The design shown in FIGS. 5($a$) and 5($b$) is that in case of realizing the optical device shown in FIG. 10 which is fabricated by applying the optical material of the present invention (hereinafter referred optionally to as "optical device of the invention").

The magnetic resonators 16 as described above may be fabricated by, for example, a semiconductor process or the manner which has been filed by the present applicant of this application as Japanese Patent Application No. 2005-139329 entitled "PHOTOREDUCTION METHOD FOR METAL COMPLEX IONS".

The manner which has been filed by the present applicant as Japanese Patent Application No. 2005-139329 entitled "PHOTOREDUCTION METHOD FOR METAL COMPLEX IONS" relates to a photoreduction method for metal complex ions wherein a laser beam is beam-irradiated with respect to a metal complex ion dispersion dispersed into a material such as a liquid, a gas, or a solid to photoreduce the metal complex ion, whereby a metallic structure is fabricated; and in this case, a predetermined coloring matter is added to the material dispersed into the metal complex ion dispersion, whereby photoreduction of the metal complex ion is controlled to improve processing accuracy in case of fabricating the metallic structure. As a result, for example, it becomes possible to manufacture directly a metallic structure of a three-dimensional nanomicron size.

Namely, in the manner, since the specified coloring matter is added to the metal complex ion dispersion, an absorption spectrum and an absorption sectional area of a material to be fabricated are maintained at constant, whereby decrease in spatial resolution as a result of propagating energy of a laser beam outside a region of the intermediate focus point of the laser beam is prevented; and further photoreduction efficiency at the intermediate focus point of the laser beam is improved. A photoreduction method of a metal complex ion by beam-irradiating a laser beam upon a metal complex ion dispersion dispersed into a material to photoreduce the metal complex ion thereby fabricating a metallic structure, characterized by adding a predetermined coloring matter to the material into which the metal complex ion dispersion is dispersed, and beam-irradiating a laser beam to the material to which the predetermined coloring matter is added.

Figure 6:
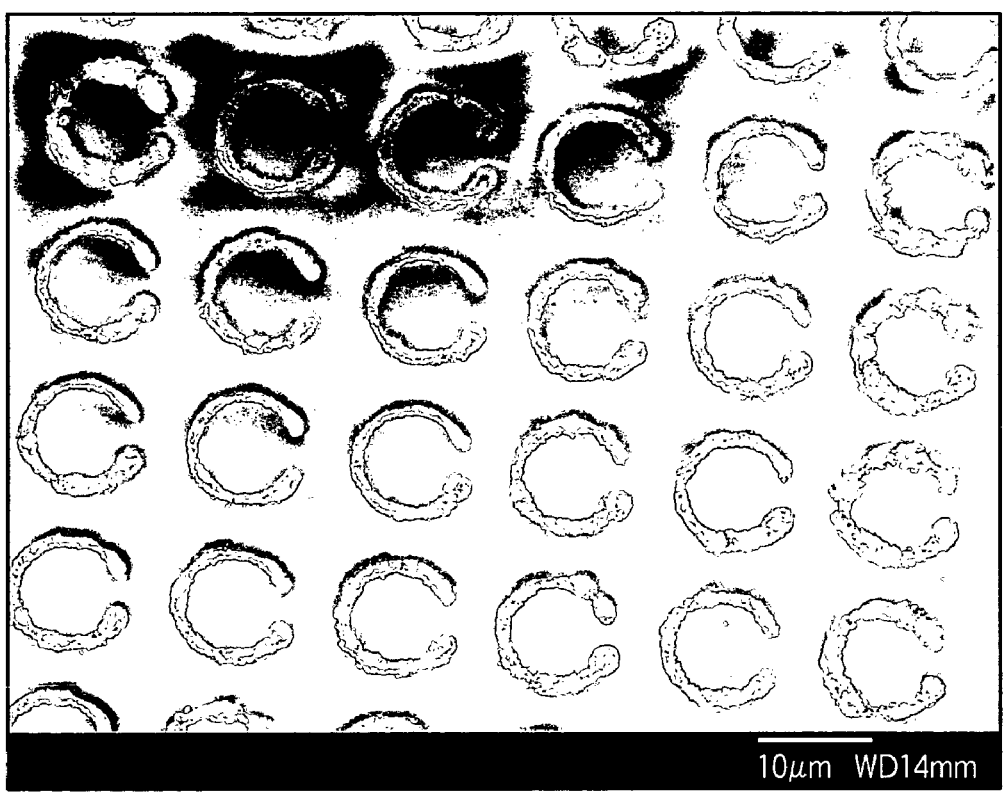
FIG. 6 is an electron micrograph showing C-shaped gold profiles fabricated in accordance with a manner which has been filed by the present applicant of this application as Japanese Patent Application No. 2005-139329 entitled "PHOTOREDUCTION METHOD FOR METAL COMPLEX IONS"

According to the application of such manner as described above, gold can be deposited as a microscopic C-shaped metal as shown, for example, in the electron micrograph presented by FIG. 6, so that the first C-shaped parts 16a and the second reversely C-shaped parts 16b of the magnetic resonators 16 may be formed.

Although the optical material 10 of the present invention shown in FIG. 2 is not provided with electrical resonators for controlling a dielectric constant, it may be provided with such electrical resonators for controlling the dielectric constant as a matter of course.

Next, an optical device according to the present invention wherein the above-described optical material of the present invention is applied will be described.

The optical device of the present invention is formed by means of the optical material of the invention so as to have a predetermined dielectric constant, magnetic permeability and shape; and the resulting device can realize independently a Brewster condition with respect to both p-wave and s-wave at the same time. Namely, the optical device of the invention has the same structure as that of the optical material of the invention, for example, the one described by referring to FIG. 2 wherein a dielectric constant, a magnetic permeability and a shape may be controlled independently with respect to both of p-wave and s-wave so as to be realizable Brewster conditions.

Since the optical material 10 of the invention shown in FIG. 2 is not provided with electrical resonators for controlling a dielectric constant, a magnetic permeability and a shape can be controlled so as to realize independently a Brewster condition at the same time with respect to both of p-wave and s-wave in the optical device of the invention wherein the optical material 10 of the invention shown in FIG. 2 is applied. In this case, when electrical resonators for controlling a dielectric constant are provided, the dielectric constant can be controlled so as to realize independently a Brewster condition at the same time with respect to both of p-wave and s-wave in addition to the magnetic permeability and the shape.

Specifically, the electrical resonators and the magnetic resonators of the optical material of the invention constituting the optical device of the present invention are arranged in only a specified plane; and the dielectric constant and the magnetic permeability are controlled in the certain one plane, whereby such a parameter wherein a Brewster phenomenon can be realized is decided in both of p-polarization and s-polarization.

However, since there are an indefinitely large number of such combinations of the dielectric constant and the magnetic permeability, a combination wherein incident angles of light waves become the same angles, that is, Brewster's angles become the same angles is searched for among these combinations; and as a result, a device is formed so as to fit to the shape of the combination searched for.

The optical device of the present invention thus obtained is disposed between two media having different refractive indices from one another, and used as a light-transmitting optical device. FIG. 7 shows an example wherein the optical device of the invention is arranged between two media having different refractive indices from one another, whereby the resulting product is used as a light-transmitting optical device wherein the optical device $M_2$ of the invention is disposed between a medium $M_1$ and another medium $M_3$, and the resulting product is used as a light-transmitting optical device.

In the case where the optical device $M_2$ is composed of the optical material 10 of the invention, it is arranged so as to obtain such positional relationship wherein a magnetic vector of s-polarization in a light wave penetrates through a predetermined plane on which the glass base plate 12 is disposed; the magnetic resonators 16 in the optical material 10 of the invention constituting the optical device $M_2$ of the invention being formed on the glass base plate 12.

In the following, one example of a manner for fabricating the optical device $M_2$ of the invention will be described by referring to the constitution shown in FIG. 7 as an example wherein there are two media $M_1$ and $M_3$ having different refractive indices from one another; and such a situation that the optical device $M_2$ of the invention (hereinafter referred optionally to as "medium $M_2$") is inserted between the medium $M_1$ and the medium $M_3$ is studied wherein a manner for calculating a Brewster's angle and optical parameters of the medium $M_2$ being the optical device of the invention is described in detail.

First, angles such as incident angle, and refraction angle used in the following description will be defined.

Namely, as a rule, an incident angle or a refraction angle is considered to be an angle defined by a light ray and a vertical line of a boundary surface of a material wherein a sign is represented by positive in the case where a direction is in the clockwise direction, while the sign is represented by negative in the case where the direction is in the counterclockwise direction, when the angle is measured based on the light ray towards the vertical line. Moreover, the incident light is supposed to be horizontal incidence; and concerning angles of the incident light and the output light, the angles are measured based on the light towards the horizontal line wherein when the direction is in the clockwise, it is represented by positive sign, while when the direction is in the counterclockwise, it is represented by negative sign. Accordingly, since the incident light is set out in the horizontal incidence, the angle is zero.

Next, definitions of the formulae used commonly in the following explanation will be made. Namely, Brewster's angles of p-polarization and s-polarization in the boundary surface between a medium having a dielectric constant $\in_a$ and a magnetic permeability $\mu_a$ and another medium having a dielectric constant $\in_b$ and a magnetic permeability $\mu_b$ are given by the following formulae:

$$\tan\theta_B^p = \sqrt{\frac{\epsilon_b(\epsilon_a\mu_b - \mu_a\epsilon_b)}{\epsilon_a(\epsilon_a\mu_a - \mu_b\epsilon_b)}} \quad (1)$$

$$\tan\theta_B^s = \sqrt{\frac{\mu_b(\epsilon_b\mu_a - \mu_b\epsilon_a)}{\mu_a(\epsilon_a\mu_a - \mu_b\epsilon_b)}} \quad (2)$$

Furthermore, a relationship between the incident angle and the refractive angle is given in accordance with Snell's law as follows.

$$\sqrt{\epsilon_a\mu_a} \sin \theta_a = \sqrt{\epsilon_b\mu_b} \sin \theta_b \quad (3)$$

As to expressions of an incident angle and a refractive angle, the incident angle is represented by $\theta$, while the refractive angle is represented by $\theta'$ wherein a dash ' is added to $\theta$, whereby the former discriminates from the latter. In case of permeation from a medium $M_1$ to another medium $M_2$, a subindex 12 is added to the angle θ. Furthermore, in the case where an angle should be specified as to p-polarization or s-polarization, a superscript p or s is applied to the angle (the same rule is applied also to a dielectric constant $\in$, and a magnetic permeability μ). Accordingly, when a light of p-polarization is input from a material 1 to another material 2, the incident angle thereof is represented $\theta_{12}^p$, while the refractive angle at that time is represented by $\theta'_{12}^p$.

A model used for an analysis is a three-layered structure as shown in FIG. 7 as mentioned above wherein it is supposed that the medium $M_1$ and medium $M_3$ are isotropic media, the dielectric constant of the medium $M_1$ is $\in_1$ and the magnetic permeability of the medium $M_1$ is $\mu_1$, while the dielectric constant of the medium $M_3$ is $\in_3$ and the magnetic permeability of the medium $M_3$ is $\mu_3$.

First, suitable values are selected for the dielectric constant $\in_2^p$ and the magnetic permeability $\mu_2^p$ with respect to p-polarization of the medium $M_2$ (Since a Brewster's angle exists originally in p-polarization even if the magnetic permeability μ is not controlled, it is satisfied by, for example, such condition $\mu_2^p=1.0$. In this case, the condition may not be $\mu_2^p=1.0$, as a matter of course. In a general material, the magnetic permeability is 1.0.). As a result, a Brewster's angle $\theta_{12B}^p$ in the boundary surface between the medium $M_1$ and medium $M_2$ in case of p-polarization and another Brewster's angle $\theta_{23B}^p$ in the boundary surface between the medium $M_2$ and medium $M_3$ in case of p-polarization can be calculated by applying the formula (1).

Moreover, the refractive angles $\theta'_{12B}^p$ and $\theta'_{23B}^p$ corresponding the respective Brewster's angles can be determined in accordance with the Snell's law (the formula (3)).

Next, concerning the dielectric constant $\in_2^s$ and the magnetic permeability $\mu_2^s$, the Brewster's angle $\theta_{12B}^s$ must coincide with the Brewster's angle $\theta_{12B}^p$ of p-polarization. When this condition is added, $\in_2^s$ and $\mu_2^s$ are not independent from one another, and when either of them is determined, then, the other is automatically determined. The following formula (4) is the one for determining the $\mu_2^s$ as a result of determining the $\in_2^s$.

$$\mu_2^s = \frac{\mu_1\left\{-\epsilon_2^s \pm \sqrt{-4\sin^2\theta_B^p\epsilon_1 + 4\sin^4\theta_B^p\epsilon_1^2 + \epsilon_2^{s2}}\right\}}{2\epsilon_1(-1+\sin^2\theta_B^p)} \quad (4)$$

There are two possibilities as to the $\mu_2^s$ as shown by ± sign in the above-described formula (4) wherein Brewster's angles $\theta'_{12B}^s$ and $\theta'_{23B}^s$ are determined with respect to the respective dielectric constants $\pm\mu_2^s$, while the refractive angles $\theta'_{12B}^s$ and $\theta'_{23B}^s$ are determined in accordance with Snell's law (the formula (3)).

Next, a manner for setting out a boundary surface will be described. Namely, since values $\in_2^p$, $\mu_2^p$, $\in_2^s$, and $\mu_2^s$ have been determined already, the Brewster's angles in the boundary surface between the medium $M_1$ and the medium $M_2$, and the boundary surface between the medium $M_2$ and the medium $M_3$ as well as the refractive angles thereof are determined uniformally, the boundary surface between the medium $M_1$ and the medium $M_2$ are set out to be the Brewster's angle with respect to the incident light. In this respect, the dielectric constant and the magnetic permeability are determined so as to be $\theta_{12B}^p = \theta_{23B}^s$, so that the angle is determined uniformally.

Figures 8A, 8B:
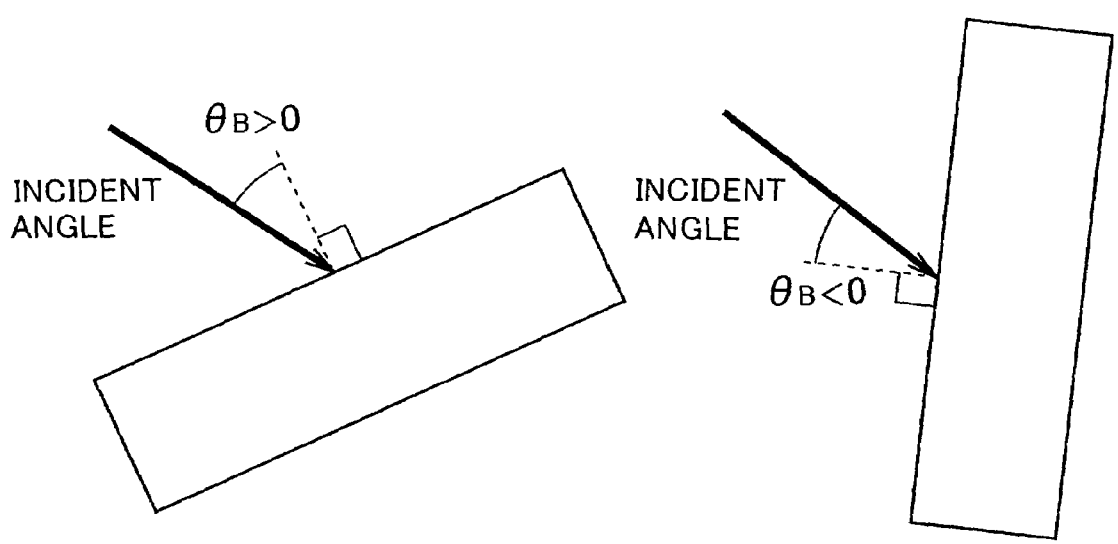

Next, the boundary surface between the medium $M_2$ and the medium $M_3$ are set out wherein setting out of the boundary surface between the medium $M_2$ and the medium $M_3$ may be made in such that the normal line direction of the boundary surface between the medium $M_2$ and the medium $M_3$ is set out so as to be $\theta_{23B}^p$ and $\theta_{23B}^s$ with respect to the light permeating through the boundary surface between the medium $M_1$ and the medium $M_2$. In this case, there are two types of a setting manner as shown in FIGS. 8(a) and 8(b) wherein one of them is in that the incident angle is set out on the plus side (see FIG. 8(a)); and the other is in that the incident angle is set out on the minus side (see FIG. 8(b)). Since two types of a setting manner are considered further with respect to p-polarization and s-polarization, respectively, four types of a pattern are obtained. Moreover, it is considered that since there are two types of possibilities as to the calculation results of $\mu_2^s$, there are totally eight pattern possibilities as a whole, after all.

As described above, combinations of the dielectric constants $\in_2^p$ and $\in_2^s$ as well as the magnetic permeabilities $\mu_2^p$ and $\mu_2^s$, and a shape of the $M_2$ which satisfy a Brewster condition at the same incident angle with respect to the boundary surface between the medium $M_1$ and the medium $M_2$ in both of p-polarization and s-polarization are determined. However, output directions of p-wave and s-wave after permeating the boundary surface between the medium $M_2$ and the medium $M_3$ do not coincide generally with each other without accompanying any arrangement. In this respect, solutions may be limited by applying the restrictive conditions as described hereunder.

The travelling direction of the light after the refraction in the boundary surface between the medium $M_1$ and the medium $M_2$ is determined by the angles $\theta_{12B}^p$, $\theta'_{12B}^p$, $\theta_{12B}^s$, and $\theta'_{12B}^s$. When they are defined by using deflection angles $\Delta\theta_{12}^p$ and $\Delta\theta_{12}^s$ at the angles with the incident light direction (horizontal direction), these deflection angles are given by the following formulae (5) and (6).

$$\Delta\theta_{12}^p = \theta'_{12B}^p - \theta_{12B}^p \quad (5)$$

$$\Delta\theta_{12}^s = \theta'_{12B}^s - \theta_{12B}^s \quad (6)$$

Furthermore, amounts of variation in the light direction at the back and forth of the boundary surface between the medium $M_2$ and $M_3$ are given by the following formulae (7) and (8) likewise.

$$\Delta\theta_{23}^p = \theta'_{23B}^p - \theta_{23B}^p \quad (7)$$

$$\Delta\theta_{23}^s = \theta'_{23B}^s - \theta_{23B}^s \quad (8)$$

When these formulae (5) through (8) are applied, the deflection angles of the output light with respect to the incident light are determined as follows.

$$\Delta\theta^p = \theta_{12}^p + \theta_{23}^p \quad (9)$$

$$\Delta\theta^s = \theta_{12}^s + \theta_{23}^s \quad (10)$$

Accordingly, it is sufficient to determine $\in_2^p$ and $\in_2^s$ so as to satisfy the following formula (11).

$$\Delta\theta^p = \Delta\theta^s \quad (11)$$

Figure 9:
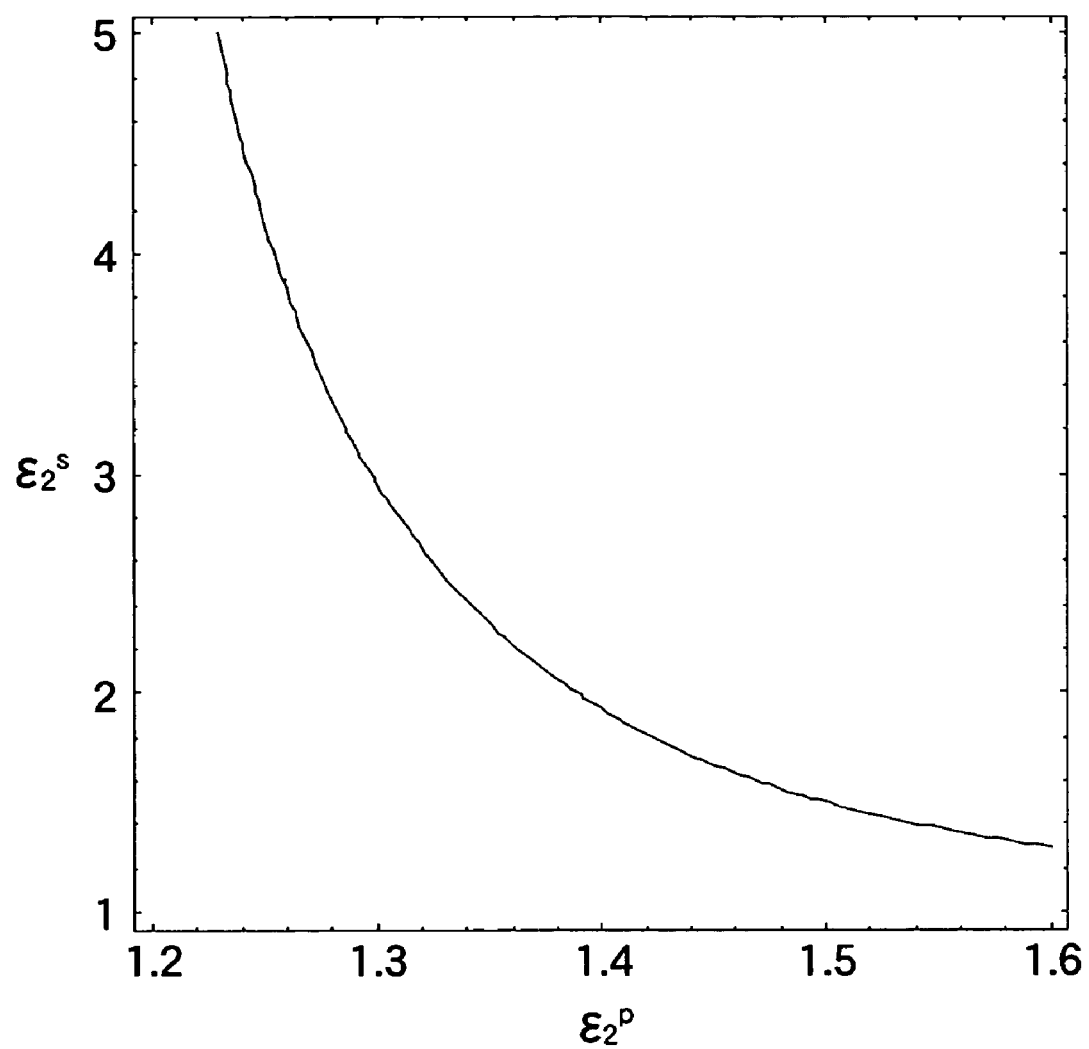
FIG. 9 is a graphical representation showing a pair of a dielectric constant $\in_2^p$ with respect to p-polarization in the medium $M_2$ and another dielectric constant $\in_2^s$ with respect to s-polarization in the medium $M_2$ both of which satisfy a Brewster condition at the same incident angle with each other with respect to the boundary surface between the medium $M_1$ and $M_2$.

However, this solving method is impossible analytically, so that it is determined by a numerical calculation, whereby the results shown in FIG. 9 are obtained. A pair of $\in_2^p$ and $\in_2^s$ constituting the curve of FIG. 9 is the solutions. FIGS. 10 through 13 illustrate these solutions in the forms of specific devices.

Figure 10:
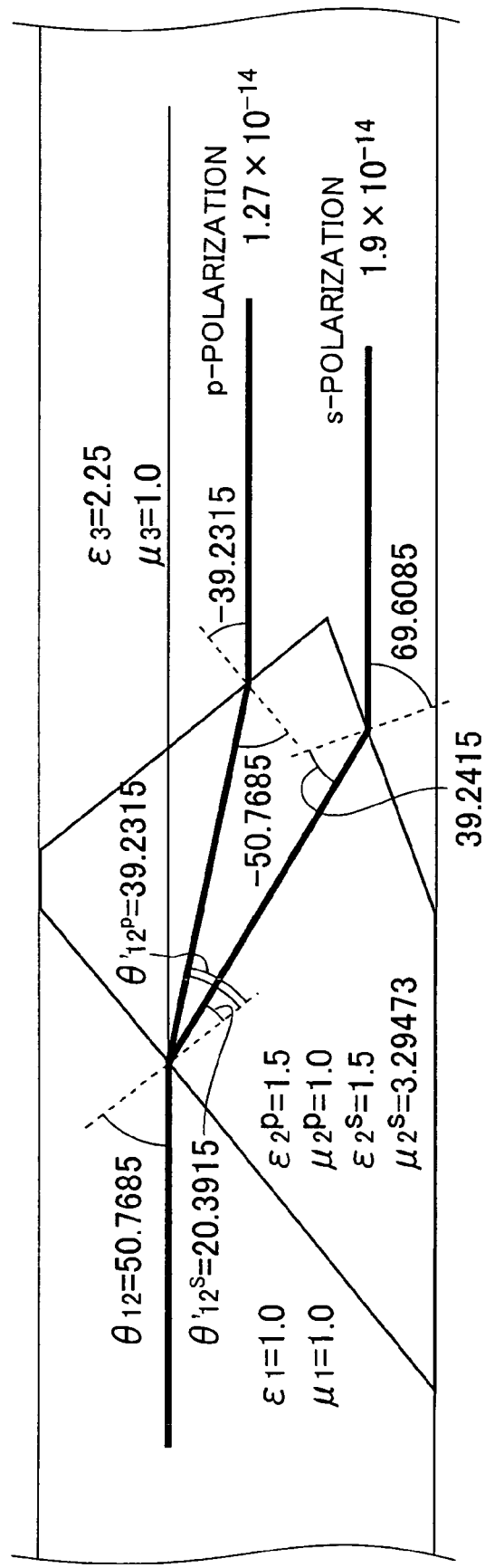
FIG. 10 is an explanatory diagram showing a fabrication example of the optical device according to the present invention.

The results shown in FIG. 10 are those solved by adding further such condition that the direction of the output light is equal to that of the incident light, in other words, the condition represented by the following formula (12):

$$\Delta\theta^p = \Delta\theta^s = 0 \quad (12)$$

in addition to the above-described conditions.

Thus, in the results shown in FIG. 10, the light input to the medium $M_2$ comes to be in parallel to the light output from the medium $M_2$, so that the output light outgoes in the same angle direction as that of the input light.

Figure 11:
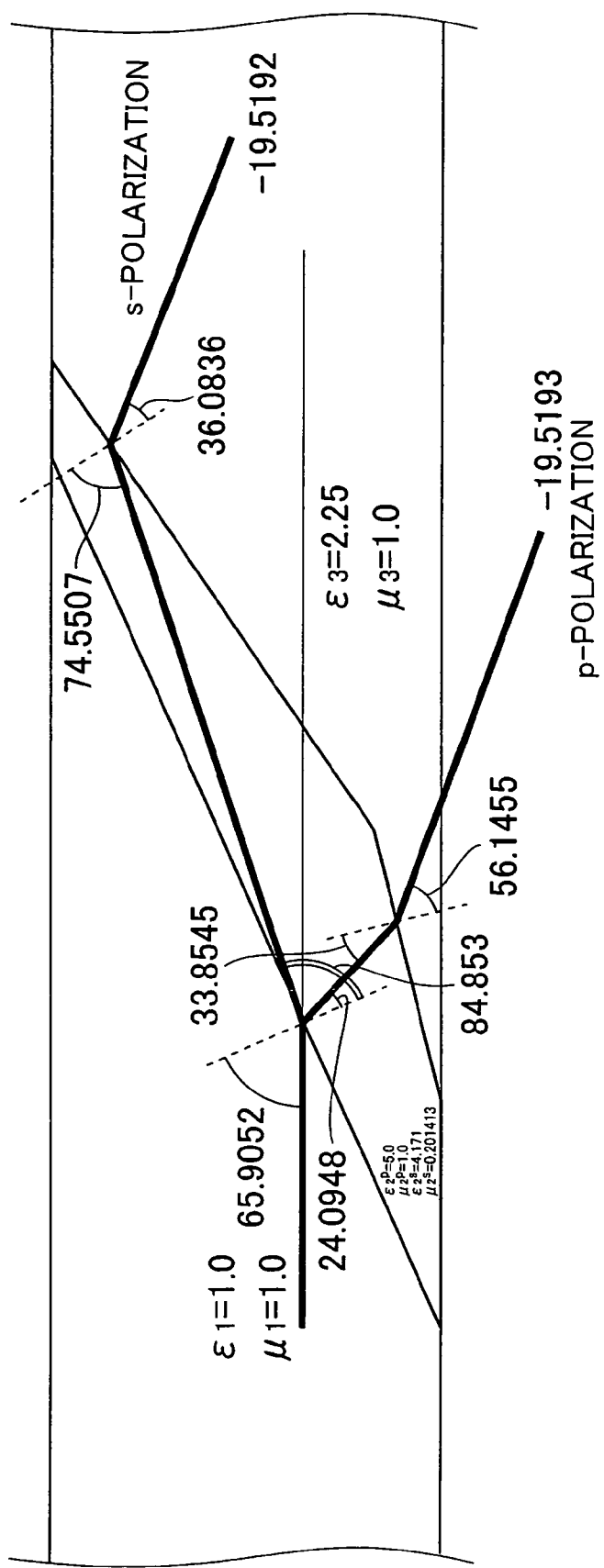
FIG. 11 is an explanatory diagram showing a fabrication example of the optical device according to the present invention.
Figure 12:
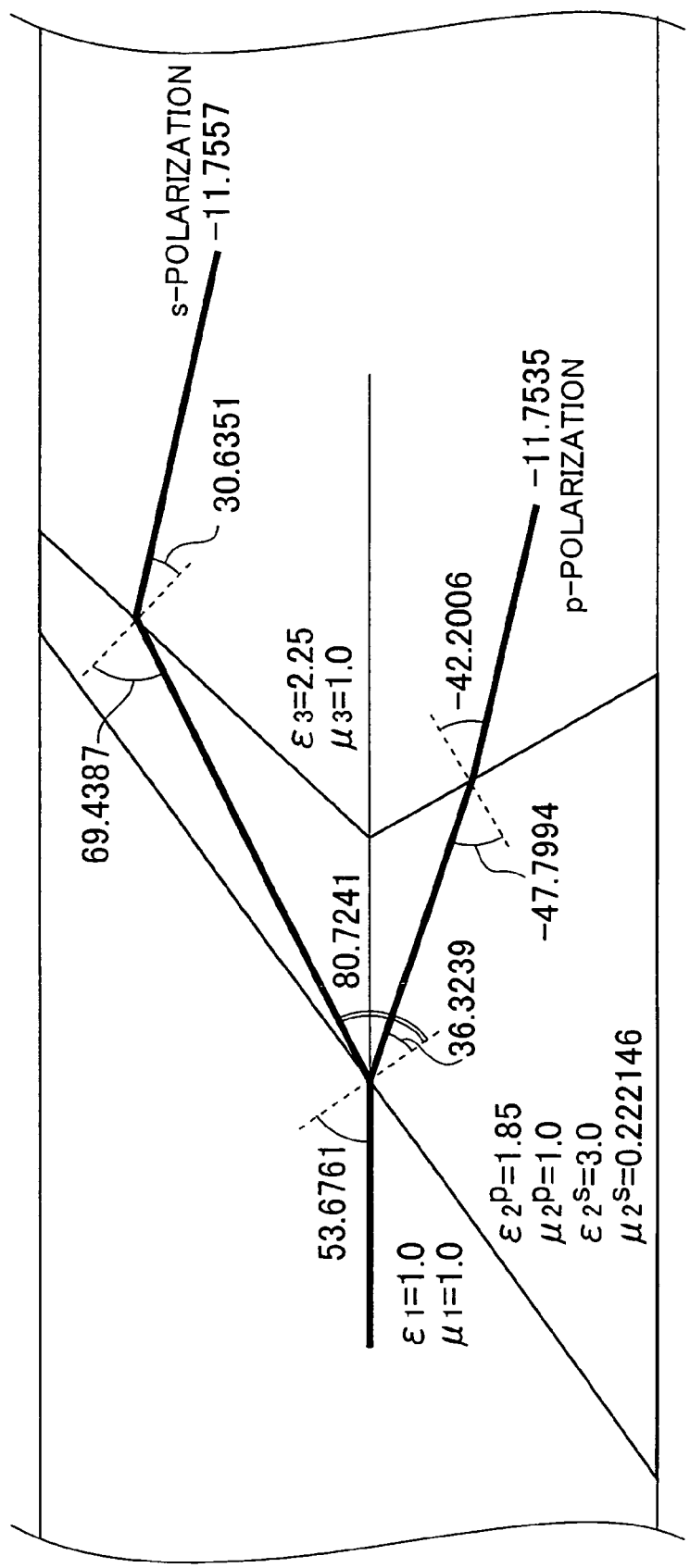
FIG. 12 is an explanatory diagram showing a fabrication example of the optical device according to the present invention.
Figure 13:
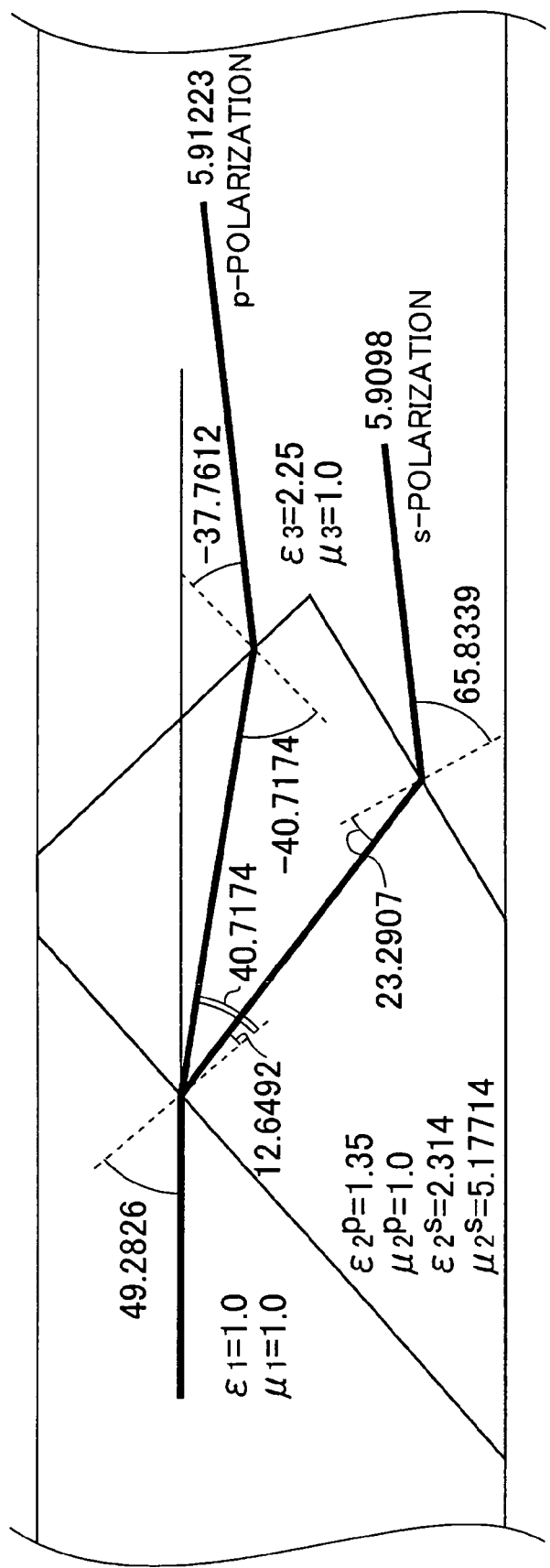
FIG. 13 is an explanatory diagram showing a fabrication example of the optical device according to the present invention.

In FIGS. 11 through 13, although examples which select different solutions from that of FIG. 10 are shown, any of them shows the case where p-polarization of the output light from the medium $M_2$ comes to be in parallel to s-polarization of the output light.

In FIGS. 10 through 13, symbols, signs, and numerals correspond to those of the above-described explanation wherein the numerical values described adjacent to the respective angles indicate a degree of each angle; and the numerical values adjacent to the terms "p-polarization" and "s-polarization" indicate output angles of the output light, respectively.

It is to be noted that the above-described manners of practice may be modified as described in the following paragraphs (1) through (6).

Figure 14:
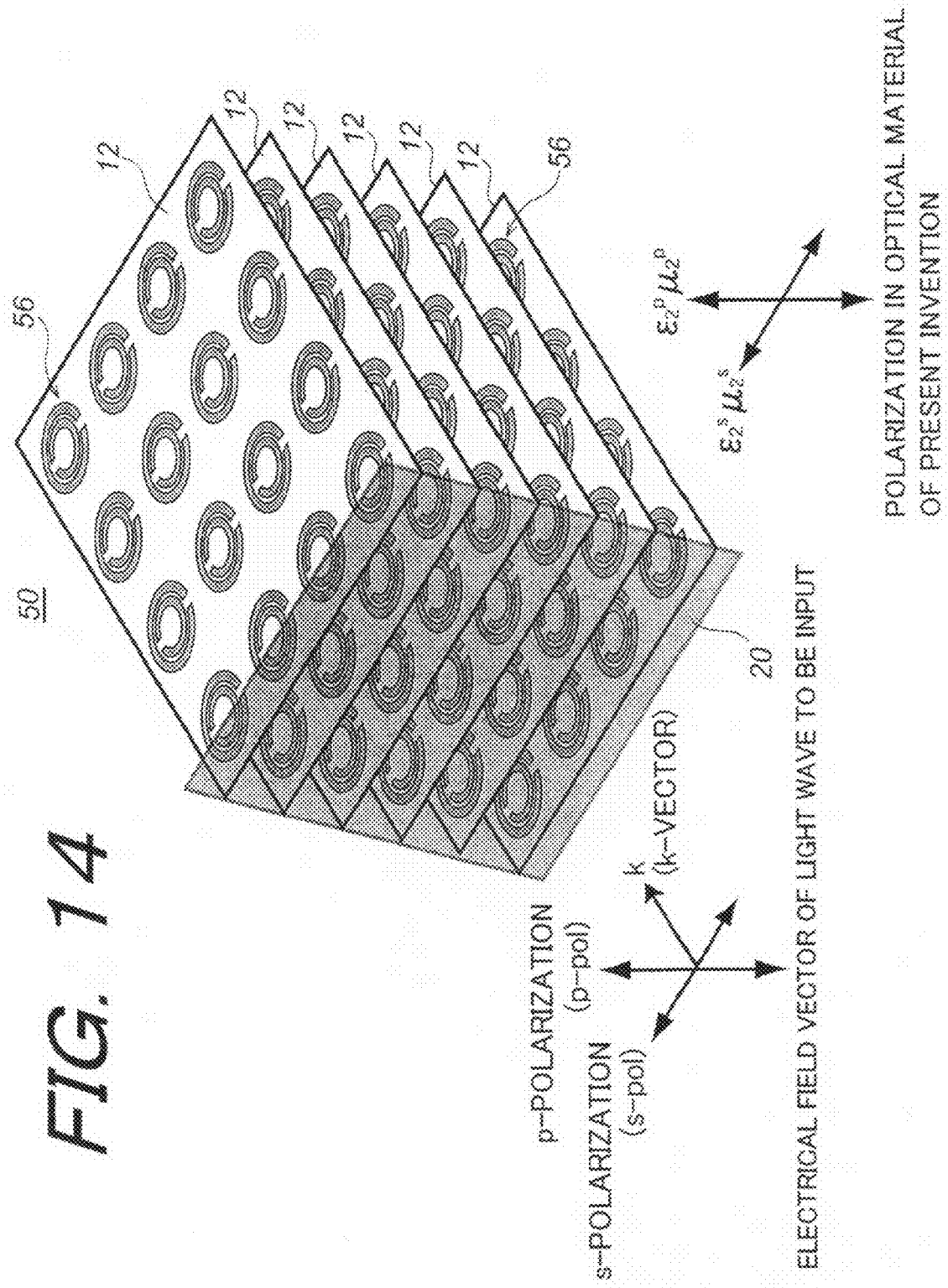
FIG. 14 is a conceptual constitutional explanatory view showing another example of the manner of practice of the optical material according to the present invention.

(1) In the above-described manners of practice, although the magnetic resonator 16 is composed of the first C-shaped part 16a having a semicircular profile and the second reversely C-shaped part 16b in the optical material 10 of the present invention, the invention is not limited thereto as a matter of course, but an optical material 50 of the present invention may be composed of magnetic resonators 56 each of which is obtained from multiply C-shaped part as shown in FIG. 14.

(2) In the above-described manners of practice, although the optical material 10 of the invention and the optical device $M_2$ (medium $M_2$) of the present invention are provided only with the magnetic resonators, the invention is not limited thereto as a matter of course, but the invention may include electrical resonators also so as to control the dielectric constant.

(3) In the above-described manners of practice, the optical material 10 of the invention and the optical device $M_2$ (medium $M_2$) of the present invention may be constituted into the one the whole size thereof is made to be larger than the wavelength of an incident light, for example, it may be the one having a larger size than a spot diameter of the incident light.

(4) In the above-described manners of practice, although the optical material 10 of the invention and the optical device $M_2$ (medium $M_2$) of the present invention are formed by laminating the glass base plates 12, the invention is not limited thereto as a matter of course, but the magnetic resonators and the electrical resonators may be formed at predetermined positions in bulk glass.

(5) In the above-described manners of practice, although the optical material 10 of the invention and the optical device $M_2$ (medium $M_2$) of the present invention are formed in such that the magnetic resonators and the electrical resonators are arranged on the glass base plates 12, the invention is not limited thereto as a matter of course, but a material of the base plate on which the magnetic resonators and the electrical resonators are formed is not restricted to the glass base plate.

(6) The above-described manners of practice as well as the modifications described in the above paragraphs (1) and (5) may be properly combined with each other It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2005-179621 filed on Jun. 20, 2005 including specification, claims, drawing and summary are incorporated herein by reference in its entirety.

What is claimed is:

1. An optical material, comprising:
    a metamaterial prepared by arranging a plurality of at least either of electrical resonators or magnetic resonators each being smaller than a wavelength of a light wave in only a predetermined plane;
    wherein at least either of the electrical resonators and the magnetic resonators arranged functioning with respect to s-polarization, and
    wherein at least either of dielectric constant or a magnetic permeability of the optical material is controlled in response to the function to induce a Brewster phenomenon in the s-polarization.

2. An optical device, comprising:
    the optical material as claimed in claim 1; and
    the incident plane of a light wave being set out at a Brewster's angle with respect to p-polarization and further at least either of the dielectric constant and the magnetic permeability of the optical material being controlled with respect to the s-polarization of the optical material, wherein the Brewster condition is independently satisfied in both the p-polarization and the s-polarization at the same time.

3. The optical device as claimed in claim 2, wherein output directions of a p-wave and an s-wave coincide with an input direction of a light wave.

4. A method for fabricating an optical device made of the optical material as claimed in claim 1, comprising:
    setting out the incident plane of a light wave at a Brewster's angle with respect to p-polarization; and
    controlling at least either of the dielectric constant and the magnetic permeability of the optical material with respect to s-polarization, wherein the Brewster condition is independently satisfied in both the p-polarization and the s-polarization at the same time.

* * * * *